United States Patent
Snowdon et al.

(10) Patent No.: US 11,228,538 B2
(45) Date of Patent: *Jan. 18, 2022

(54) APPARATUS AND METHOD FOR LOW LATENCY SWITCHING

(71) Applicant: Arista Networks, Inc., Santa Clara, CA (US)

(72) Inventors: David Snowdon, Darlinghurst (AU); Scott McDaid, Bilgola Plateau (AU); Charles Thomas, Warrawee (AU); Lindsay Powles, Baulkham Hills (AU)

(73) Assignee: Arista Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/820,409

(22) Filed: Mar. 16, 2020

(65) Prior Publication Data

US 2020/0244595 A1 Jul. 30, 2020

Related U.S. Application Data

(63) Continuation of application No. 15/315,708, filed as application No. PCT/AU2014/050391 on Dec. 3, 2014, now Pat. No. 10,630,608.

(30) Foreign Application Priority Data

Aug. 13, 2014 (AU) .................. 2014903158
Oct. 23, 2014 (AU) .................. 2014904247

(51) Int. Cl.
*H04L 12/931* (2013.01)
*H04L 12/413* (2006.01)
(Continued)

(52) U.S. Cl.
CPC ............ *H04L 49/201* (2013.01); *G06F 13/00* (2013.01); *H04L 12/413* (2013.01); *H04L 45/7457* (2013.01); *H04L 49/101* (2013.01)

(58) Field of Classification Search
CPC . H04L 49/201; H04L 49/101; H04L 45/7457; H04L 12/413; G06F 13/00
See application file for complete search history.

(56) References Cited

U.S. PATENT DOCUMENTS 7,521,961 B1    4/2009  Anderson
7,847,589 B2   12/2010  Kyouno et al.
(Continued)

FOREIGN PATENT DOCUMENTS

EP      0669764 A1    8/1995
JP      H11-261622 A  9/1999
(Continued)

OTHER PUBLICATIONS

Kenichi Ikawa et al.; "Method of Optical Wireless Communications for High-Speed LAN"; The Institute of Electronics, Information and Communications Engineers, IEICE Technical Report, OCS2009-108(Jan. 2010) vol. 109, No. 400; pp. 49-54; Jan. 2010.

(Continued)

*Primary Examiner* — Pao Sinkantarakorn
*Assistant Examiner* — Kabir U Jahangir
(74) *Attorney, Agent, or Firm* — Chamberlain, Hrdlicka, White, Williams & Aughtry

(57) ABSTRACT

A method of data switching. Data is received by at least one input port of a crosspoint switch. The crosspoint switch configurably casts the data to at least one output port of the crosspoint switch. Each output port of the crosspoint switch is connected to a respective input of a logic function device such as an FPGA. The logic function device applies a logic function to data received from each output port of the (Continued)

crosspoint switch, such as address filtering or multiplexing, and outputs processed data to one or more respective logic function device output interfaces. Also, a method of switching involving circuit switching received data to an output while also copying the data to a higher layer function.

18 Claims, 11 Drawing Sheets

(51) Int. Cl.
*G06F 13/00* (2006.01)
*H04L 12/743* (2013.01)
*H04L 12/933* (2013.01)

(56) References Cited

U.S. PATENT DOCUMENTS

| | | | |
|---|---|---|---|
| 8,537,697 B2* | 9/2013 | Leong | H04L 43/106 370/252 |
| 2002/0159468 A1 | 10/2002 | Foster et al. | |
| 2006/0013135 A1 | 1/2006 | Schmidt et al. | |
| 2007/0153772 A1* | 7/2007 | Shankar J | H04L 43/0858 370/352 |
| 2007/0200594 A1 | 8/2007 | Levi et al. | |
| 2007/0280223 A1 | 12/2007 | Pan et al. | |
| 2008/0198838 A1 | 8/2008 | Moote | |
| 2010/0259687 A1 | 10/2010 | Into | |
| 2010/0317374 A1* | 12/2010 | Alpert | H04W 68/02 455/458 |
| 2011/0264578 A1 | 10/2011 | Chapman et al. | |
| 2012/0250445 A1 | 10/2012 | Hoshino et al. | |
| 2013/0215754 A1 | 8/2013 | Tripathi et al. | |
| 2013/0343390 A1 | 12/2013 | Moriarty et al. | |
| 2015/0271106 A1 | 9/2015 | Walker et al. | |

FOREIGN PATENT DOCUMENTS

| | | |
|---|---|---|
| JP | 2012-165343 A | 8/2012 |
| JP | 2012-208975 A | 10/2012 |
| JP | 2013-131973 A | 7/2013 |
| WO | 2008/101041 A1 | 8/2008 |
| WO | 2008/152697 A1 | 12/2008 |

OTHER PUBLICATIONS

Notification of Reasons for Refusal issued in corresponding Japanese Application No. 2016-574895, dated Jun. 13, 2017.

Reiner Hartenstein; "A Decade of Reconfigurable Computing: a Visionary Retrospective"; Proceedings of the Conference on Design, Automation and Test in Europe (DATE '01); Mar. 2001(https://www.cs.york.ac.uk/rts/docs/SIGDA-Compendium-1994-2004/papers/2001/date01/pdffiles/09a_1.pdf).

* cited by examiner

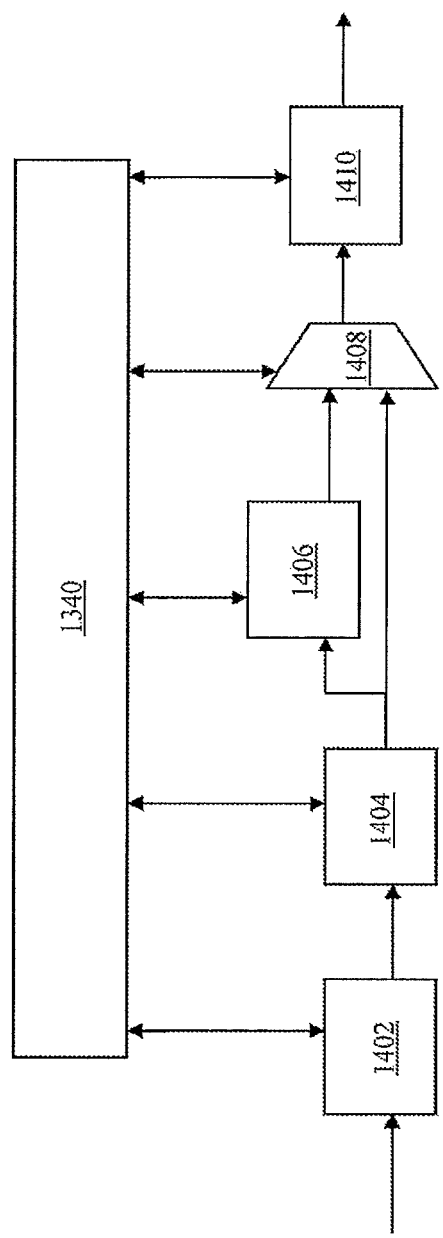

APPARATUS AND METHOD FOR LOW LATENCY SWITCHING

CROSS-REFERENCE TO RELATED APPLICATIONS

Pursuant to 35 U.S.C. § 120, this application is a continuation of U.S. application Ser. No. 15/315,708, filed on Dec. 1, 2016, entitled "APPARATUS AND METHOD FOR LOW LATENCY SWITCHING," which is herein incorporated by reference in its entirety. Pursuant to 35 U.S.C. § 371, U.S. application Ser. No. 15/315,708 is a National Phase application of PCT/AU2014/050391, filed on Dec. 3, 2014, which claims the benefit of Australian Provisional Application Serial No. 2014903158, filed Aug. 13, 2014, and Australian Provisional Application Serial No. 2014904247, filed Oct. 23 2014, each of which is entitled APPARATUS AND METHOD FOR LOW LATENCY SWITCHING and are incorporated herein by reference.

TECHNICAL FIELD

The present invention relates to network data switching, and in particular to an efficient low latency data switch using a combination of one or more crosspoint switches with one or more logic function devices such as FPGAs or ASICs, to implement desired networking functionality.

BACKGROUND OF THE INVENTION

It is often desirable to take data packets from one source and to send the data packets to one or more of a number of possible destinations. This is the case in the downstream direction from a stock exchange, for example, where it is desirable for a number of machines such as stock traders' computers to potentially receive packets from the exchange.

In some applications it is appropriate to broadcast or multicast from one port to many ports. Multicast broadcasts every packet at the input of the device (the switch) to every output of the switch and can for example be achieved by use of a crosspoint switch. However, in other scenarios such as in the case of a packet switch, unicast communications between two endpoints should be private.

Addressable switching can be implemented in an integrated circuit by processing downstream packets using some mechanism (e.g. such as a content addressable memory in a traditional packet switch). Conventionally this involves receiving data on a single transceiver, checking the packet address, referring to a lookup table to identify a port associated with the address, and then directing the packet to only that port. This approach is based on the principle of optimising bandwidth usage, but requires relatively complex circuitry within the switch.

Current network switches require that the layer 1 (physical layer) data be converted to layer 2 (the data link layer) for address checking, before being returned to layer 1. Converting data from layer 1 to layer 2 requires data deserialization into a parallel stream because it is difficult to implement layer 2 features in a serial stream at the frequencies involved. This means that any layer 2 processing is much slower than layer 1, and layer 2 address checking introduces a significant delay of approximately 200-400 as for even the fastest layer 2 network switches. When used for upstream aggregation of multiple traders' data traffic into a single stream, this requires use of a many-to-one switch such as an Ethernet switch in addition to a MetaConnect C16 switch from Metamako LP, undesirably increasing latency.

Moreover, network switches must often deal with both upstream and downstream data paths in a single device, complicating the signal paths and introducing clocking limitations. Many existing switches are designed in order to optimise bandwidth and flexibility of use amongst many use cases.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

In this specification, a statement that an element may be "at least one of" a list of options is to be understood that the element may be any one of the listed options, or may be any combination of two or more of the listed options.

SUMMARY OF THE INVENTION

According to a first aspect the present invention provides a method of data switching, the method comprising;

receiving data at at least one input port of a crosspoint switch;

the crosspoint switch configurably casting the data to at least one output port of the crosspoint switch;

connecting the or each output port of the crosspoint switch to a respective input of a logic function device;

the logic function device applying a logic function to data received from the or each output port of the crosspoint switch and outputting processed data to one or more respective logic function device output interfaces.

According to a second aspect the present invention provides a data switch comprising:

a crosspoint switch having at least one input port for receiving data and a plurality of output ports, the crosspoint switch being configured to configurably cast data received at at least one input port of a crosspoint switch to at least one of the output ports; and a logic function device having one or more inputs respectively connected to the or each output port of the crosspoint switch, the logic function device being configured with at least one logic function to be applied to data received from the output ports of the crosspoint switch and which outputs processed data to respective logic function device output interfaces.

According to a third aspect the present invention provides a non-transitory computer readable medium for configuration of a data switch, comprising instructions which, when executed by one or more processors, causes performance of the following:

receiving data at at least one input port of a crosspoint switch;

the crosspoint switch configurably casting the data to at least one output port of the crosspoint switch;

connecting the or each output port of the crosspoint switch to a respective input of a logic function device;

the logic function device applying a logic function to data received from the or each output port of the crosspoint switch and outputting processed data to one or more respective logic function device output interfaces.

According to a fourth aspect the present invention provides a computer program product comprising computer program code means to make a computer execute a procedure for a software controller of a data switch, the computer program product comprising:

computer program code means for selecting one of a plurality of logic function device functions In relation to which data is to be processed;

computer program code means for controlling a crosspoint switch to configurably cast data received at at least one input port of a crosspoint switch to at least one output port of the crosspoint switch, the or each output port of the crosspoint switch being connected to a respective input of a logic function device; and computer program code means for controlling the logic function device to apply the selected logic function to data received from the or each output port of the crosspoint switch and to output processed date to one or more respective logic function device output interfaces.

In some embodiments of the invention, the crosspoint switch configurably casting the data to at least one output port of the crosspoint switch may comprise the crosspoint switch multicasting the data to a plurality of output ports of the crosspoint switch. In some embodiments, the crosspoint switch configurably casting the data to at least one output port of the crosspoint switch may comprise the crosspoint switch unicasting the data to one output port of the crosspoint switch.

The logic function device may comprise a field programmable gate array (FPGA), a suitably configured application-specific integrated circuit (ASIC) such as a suitably configured x86 CPU based processor or a multicore microprocessor having an inbuilt network interface, or a plurality of such devices. Discussion herein of embodiments utilising an FPGA are to be understood as also being applicable to an ASIC or a suitably configured processor within the scope of the present invention.

Some embodiments of the present invention may thus effectively involve optimising for improved low latency and/or improved determinism (fewer MAC collisions), through the abandonment of optimising bandwidth usage. By using the broadcast functionality of a crosspoint switch to distribute data to more than one receiver, the aggregate bandwidth possible is reduced and individual hardware elements' data throughput is not necessarily maximised, however the present invention recognises that the parallel, processing of those multiple identical data streams has other beneficial effects. The present invention thus recognises that many existing switches are designed in order to optimise bandwidth and flexibility of use amongst many use cases, but that this is at the expense of latency and determinism.

The data may be downstream data originating from one or more servers and intended for one or more client devices. Additionally or alternatively, the data may be upstream data originating from one or more client devices and intended for one or more servers. Additionally or alternatively, the data may be peer to peer data such as data being switched between nodes of a high performance computing cluster, or between nodes of a data centre network.

The connection of the output ports of the crosspoint switch to the input ports of the FPGA may in some embodiments comprise a direct connection, or in other embodiments may be via interposed circuit elements such as AC coupling capacitors, or ICs which perform level translation, buffering, amplification, or signal recovery.

The or each FPGA output interface may comprise one or more of an output port, a Peripheral Component Interconnect Express (PCIe) output, other output interface, or a group of streams of a high speed communications interface.

In some embodiments, the data may be downstream data received from a remote location such as a server and intended for distribution to one or more client devices local to the crosspoint switch. Devices are considered local to the switch if connected to the switch and interfacing with a broader network via the switch, even if not in the same physical locality as the switch. In such embodiments the logic function applied by the FPGA may comprise content-based filtering, such as address filtering, whereby the crosspoint switch multicasts the data to a plurality of output ports of the crosspoint switch, and a plurality of client devices are respectively associated with the plurality of FPGA output ports, and whereby the FPGA filters data from each output port of the crosspoint switch in a manner that only data addressed to a particular local client device is output from the respective FPGA output port. Such embodiments thus utilise the crosspoint switch for efficient broadcasting, and utilise the FPGA for efficient addressing and other functions. The content-based filtering could involve addressing by reference to the destination or source address from L2, L3 or L4, but could also include protocol based filtering, state-based filtering and deep packet inspection in the case of a firewall, intrusion detection, or extrusion detection system, filtering by invalidation of packets which are to be filtered, or any other logic function which is implemented in the FPGA. Using the crosspoint switch to copy the data stream to more than one function block in the FPGA allows multiple functions to be performed on the same data simultaneously within the FPGA. In such embodiments, a single transceiver of the FPGA may serve as both the receive and transmit for each filter. Alternatively, the FPGA may pass data to output ports without address filtering, in embodiments in which another device such as the client device connected to the FPGA output port is instead configured for such address filtering. Such embodiments thus employ a 'broadcast and filter' approach to addressing each data packet, in contrast to bandwidth optimised layer 2 lookup approaches.

In other embodiments, the data may be upstream data received from one or more client devices local to the crosspoint switch and intended for delivery to one or more remote locations such as one or more servers. In such embodiments, the logic function provided by the FPGA may be multiplexing. Multiplexing may be provided by the FPGA by each receiver input of the FPGA being connected to a respective FIFO buffer or memory queue for synchronising the respective data clocks, and passing the output of each FIFO or memory queue to a multiplexer to multiplex data from more than one client device into a single upstream data stream. The upstream data stream may then be output by a transmitter at a port of the FPGA, and passed to the crosspoint switch for delivery to an external network front panel port, or more generally to a client device which might include a network interface card internal to the switch, for example. In some embodiments the FPGA logic may be configured to implement a firewall, a layer 3 or 4 function such as IP addressing, or packet conversion, potentially performed in parallel. Some embodiments may further provide for data delivery from local devices to a plurality of remote locations by:

the crosspoint switch multicasting upstream data from local devices to a plurality of multiplexers in the FPGA;

filtering an output of each multiplexer with an addressing filter so that data is only relayed from the respective multiplexer to a respective external network port when addressed for that port.

In some embodiments the crosspoint switch may handle both upstream and downstream data, whereby one of the streams of data is directed by the crosspoint switch to the FPGA whereas the other stream of data is connected directly between crosspoint switch front ports to one or more client devices.

The FPGA may be configured to implement layer 3 (network layer) routing by providing every transceiver with a dedicated routing table. While being hardware inefficient such embodiments present considerable latency advantages as compared to layer 3 routers using a single routing table used for all routing.

Embodiments of the invention may provide a separate FPGA, or separate FPGA logic, for each of the upstream and downstream data functions. Such embodiments allow the upstream and/or downstream logic to be physically smaller in the FPGA, permitting fewer pipeline stages to be employed in the FPGA logic and providing reduced latency and routing delays. Ensuring that the logic for the upstream and downstream data components do not share hardware such as transceivers is advantageous in easing routing congestion. Similar considerations apply to peer-to-peer configurations such as use of the data switch for load levelling between processor cores in high performance computing applications.

The present invention recognises that providing an FPGA provides large resources of logic gates and RAM blocks to implement either simple or complex digital computations, with very fast I/Os and data buses. Because the FPGA's logic function is reconfigurable, each port output can potentially have a different logic function implemented, i.e. a simple filter, a multiplex of a number of input streams, a multiplex-and-filter, or a more traditional layer 2 switch function based on a ternary content addressable memory (TCAM). Moreover, such functions can be updated when required and in a programmable and very timely manner which can be critical for applications with time sensitive reconfiguration requirements such as when handling market trading data. Some embodiments of the invention may thus further provide a management computer operable to reprogram logic blocks of the FPGA using the applicable hardware description language or the like, thus permitting rapid remote reconfiguration such as the adjustment of a filter function or hard-coded routing rules within microseconds. The management computer may for example comprise a 64 bit x86 processor, preferably remotely accessible such as via the Internet. The management computer may deliver instructions to the FPGA via a high speed serial computer expansion bus such as PCI express (PCIe), or via a network link. The filters or other logic functions could in some embodiments be internally automatically configured by actions of the or a FPGA. For example configuration information might be passed, in a low-bandwidth way, between multiplexers, filters or logic function blocks of the FPGA, such as for the purpose of emulating the MAC address learning function in a conventional switch.

In some embodiments, the FPGA may be configured with a plurality of functions, with the desired function being adaptively selected by the crosspoint switch switching data to the FPGA port associated with the desired function.

Data from, the crosspoint may be directed to any suitable logic function provided by the FPGA, including for example simple logic gates such as AND or XOR in simpler communications protocols in which the FPGA can operate at layer 1, or more complex combinatorial functions such as filtering and/or multiplexing. The logic functions may use the contents of some packet fields as inputs and then modify the contents of other packet fields, as appropriate, using sequential and combinatorial logic. Filtering may in some embodiments be based on any one or more of a field or combination of fields, may utilise a filter compiled dynamically from an expression or program, may involve state based inspection by deep packet inspection, or may comprise a financial market data risk checking gateway. The logic function may involve a transformation, such as Layer 3 routing (e.g. in Ethernet/IP transform a MAC address based on IP address information), Layer 4 routing (e.g. in IP/UDP or IP/TCP transform an IP address based on UDP or TCP port information, implementing NAT), a financial market data ticker plant or parser, or an application protocol translator. The logic function may effect an arbiter, such as to feed data from many sources and discard duplicates (e.g. for combining lossy but high performance communications links with reliable but slow links). In some embodiments, the FPGA may be configured to effect time stamping of data in the data stream, thus providing a layer 2 function in the same device as layer 1 functions. To effect timestamping the FPGA can detect the start of packets on its input data interfaces and generate a timestamp which can be added to the packet as metadata, stored for later processing, sent to another device for analysis and/or added to the packet in place of the frame check sequence (FCS) or the interframe gap (IFG). A further function provided by the FPGA may be data packet capture, whereby the crosspoint delivers a duplicate data stream directly or indirectly to a data packet capture RAM disk and/or PCIe link.

The FPGA may in some embodiments further be provided with an external high speed serial bus connection to an external connector, to enable connection of the FPGA to larger-scale functions such as large data memories, or large computing capacity.

The FPGA may further be provided with logic configured to serve as a pulse-per-second monitor, detecting the leading edge of received data symbols, in order to allow internal clocks (generally used for timestamping) to be synchronized to an external time source (such as a GPS) which generates a pulse at some defined time (usually at the start of a second).

Data ports of the crosspoint switch may receive data from any suitable cable including for example copper cables using 10GBASE-T interface type or 1000BASE-T interface type, 100BASE-TX copper, optic fibres using 10GBASE-R/1000BASE-X, direct-attach copper. The crosspoint switch may receive data from any suitable pluggable module, such as SFP, SFP+, QSFP, QSFP+, CFP. Those modules might allow a connection via direct-attach copper, 1 GBase-SX, 10 GBase-SR, 10 GBase-LR, DWDM, or other connectivity standards. Alternatively the crosspoint switch might be connected directly to another device using a connector or printed circuit board.

The crosspoint switch may be provided as an ASIC physically separate to the FPGA.

Transceivers of the FPGA may in some embodiments be connected directly to front panel ports of a device containing the FPGA and crosspoint switch. Alternatively, transceivers of the FPGA may be connected to the crosspoint switch and isolated from the front panel ports.

In some embodiments of the third or fourth aspects of the invention, the computer code or instructions may reside on a server available for purchase by switch owners or administrators, in order to configure their hardware with new functions facilitated by the computer code or instructions. The computer code or instructions may comprise source code, FPGA hardware description language (HDL), or instructions in a higher level language which may be compiled into HDL, for example.

According to a fifth aspect the present invention provides a method of physical layer data switching, the method comprising;

receiving data at at least one input port of a switch;

circuit switching the data to at least one output port of the switch; and copying the data to a higher layer process.

According to a sixth aspect the present invention provides a physical layer data switch, the switch comprising:

a plurality of data inputs which can each be configurably circuit switched to one or more of a plurality of data outputs, a first data output receiving data which has been circuit switched from a first input, and a second data output receiving a copy of the data from the first input; and higher layer function circuitry connected to the second data output.

According to a seventh aspect the present invention provides a non-transitory computer readable medium for configuration of a data switch, comprising instructions which, when executed by one or more processors, causes performance of the following:

circuit switching of data received at at least one input port of a switch to at least one output port of the switch; and copying of the data to a higher layer process.

According to an eighth aspect the present invention provides a method of physical layer data switching, the method comprising;

receiving data at at least one input port of a switch;

circuit switching the data to at least one output port of the switch; and a higher layer process modifying or supplementing the data and producing a second data output at a second output port of the switch.

The fifth to eighth aspects of the present invention thus recognise that physical layer processing results in low latency and flexibility of protocols, but that physical layer switches do not provide useful counters and statistics which can only be extracted at higher layers, and that physical layer switches thus present a disadvantage to network administrators because for example it is not possible to use such a switch to monitor a data link and diagnose problems.

In contrast to prior physical layer switches, embodiments of the fifth to eighth aspects of the present invention instead provide a physical layer switch that retains the benefits of low latency and protocol flexibility, while also providing higher layer functionality, all without adding any latency overhead to data throughput. In particular, by circuit switching data direct from an input to an output the physical layer switch operates at a low latency level. Moreover, by copying the same data to a higher layer process, higher level monitoring functions can be implemented without affecting the latency of the physical layer switching because such functions are performed in parallel with the switching. For example in some embodiments of the fifth to eighth aspects of the present invention the higher layer process may comprise identifying IP packets and Ethernet frames, which are common protocols used on networks. Other protocols may include Fibre Channel, InfiniBand™ and SDI. This parallelism means that even though the higher level monitoring counters and statistics take additional time to process, this does not delay the data as it passes through the switch.

In some embodiments of the fifth to eighth aspects of the present invention, the outputs of the higher layer process(es) such as counters and statistics are accessed via a management interface of the switch and do not impede the low latency of the data path.

Reference herein to a higher layer process is to be understood as referring to a process which is not carried out at the physical layer. In some embodiments of the fifth to eighth, aspects of the present invention the higher layer process may comprise conversion of physical layer data for higher level processing, including detecting physical layer idle patterns and physical layer errors, for example 8B/10B code violations.

In some embodiments of the fifth to eighth aspects of the invention, data received at a plurality of data inputs, and preferably all data inputs, is copied to one or more respective higher layer process. Such embodiments may thus effect layer 1 switching of each or all of the data inputs while simultaneously providing a higher layer process or processes such as packet identification for each interface, without impacting latency.

In some embodiments of the fifth to eighth aspects of the invention, the higher layer function may comprise a counter of data packet statistics for the respective interface.

In some embodiments of the fifth to eighth aspects of the invention, the higher layer function may additionally or alternatively comprise a counter of a number of octets received and transmitted.

In some embodiments of the fifth to eighth aspects of the invention, the higher layer function may additionally or alternatively comprise a counter of a number of packets, by type (unicast, multicast and broadcast).

In some embodiments of the fifth to eighth aspects of the invention, the higher layer function may additionally or alternatively comprise a counter of a number of packets, by protocol (Ethernet, IP, UDP, TCP, HTTP, SSH, SNMP, ARP, etc).

In some embodiments of the fifth to eighth aspects of the invention, the higher layer function may additionally or alternatively comprise a counter of the number of packets, by size. For example a count of the number of 64 byte, 65-127 byte, 256-511 byte, etc, data packets;

In some embodiments of the fifth to eighth aspects of the invention, the higher layer function may additionally or alternatively comprise a counter of the number of packet errors due to invalid frame check sequence (FCS), packet 'runts', packet 'giants' and/or alignment errors or the like.

In some embodiments of the fifth to eighth aspects of the invention, the higher layer function may additionally or alternatively comprise a counter of the number of dropped frames.

In some embodiments of the fifth to eighth aspects of the invention, the higher layer function may additionally or alternatively comprise VLAN and/or MACsec counters.

In some embodiments of the fifth to eighth aspects of the invention, the higher layer function may additionally or alternatively comprise detecting a link idle state.

In some embodiments of the fifth to eighth aspects of the invention, the higher layer function may additionally or alternatively comprise the ability to inject an idle pattern, or cause an idle pattern to be transmitted onto the wire.

In some embodiments of the fifth to eighth aspects of the invention, the higher layer function may additionally or alternatively comprise a counter for physical layer errors, for example 8B/10B code errors from which it is possible to calculate an estimate for the physical layer bit error rate.

In some embodiments of the fifth to eighth aspects of the invention, the higher layer function may additionally or alternatively comprise packet inspection to provide heuristics on the switching device, for example identifying the hosts and/or devices present at the other end of a or each connection by inspecting packet MAC addresses.

In some embodiments of the fifth to eighth aspects of the invention, the higher layer function may be applied in respect of data captured on either or both of the receive and transmit interfaces.

The higher layer process output, such as a statistic counter value, in some embodiments of the fifth to eighth aspects of the invention can be reported by a management module of the switch. In some such embodiments the management module functionality can include a command line, a web interface and/or other mechanisms such as SNMP that allow a separate computer to query or receive published counter values.

In some embodiments of the fifth to eighth aspects of the invention, the higher layer function may additionally or alternatively comprise the ability to timestamp a packet. Such embodiments recognise that timestamping in a switch is useful for measuring network latency, and for accurate records that can be used for post examination, testing/modelling/replaying historical network traffic. In embodiments handling Ethernet packets, and noting that such packets do not have a field for accurate timestamping information, the timestamp information may be added to the packet by increasing the size of the packet (prepend or append the timestamp data).

Alternatively, timestamp data may be added to each packet by replacing a part of the packet that is used for other information. Such embodiments of the fifth to eighth aspects of the invention have the benefit that it is possible to timestamp the packets on a fully saturated link, i.e. a link which has no more space on the channel for larger packets. One approach that does not impact the size of a packet is to replace the frame check sequence (FCS) field in the Ethernet frame with a 32-bit timestamp value. This might be done only after the FCS is checked and found to be error-free. If the FCS is found to be in error then a special timestamp value can be used in the affected packet. The special timestamp will be one that never occurs for a valid packet. The 32-bit timestamp might represent the number of nanoseconds from a known reference instant in time that can be interpreted as an absolute unit of time by a separate process that also knows the reference instant. For example, the 32-bit timestamp may represent the least significant 32 bits of the absolute time in nanoseconds. In another embodiment the Ethernet frame preamble may be partially replaced with a timestamp value.

Embodiments of the fifth to eighth aspects of the invention providing time stamping of the copy of the data in the data stream thus provide a layer 2 function in the same device as layer 1 switching. To effect timestamping the device can detect the start of packets on its input data interfaces and generate a timestamp which can be added to the packet as metadata, stored for later processing, sent to another device for analysis and/or added to the packet in place of the frame check sequence (FCS) or the interframe gap (IFG).

In embodiments of the fifth to eighth aspects of the invention in which the higher layer function comprises timestamping packets, the higher layer device may in some embodiments output a second data stream comprising a delayed timestamped copy of the original data stream. Such embodiments thus deliver the data to the output at low latency, while also producing a delayed copy of the same data with added timestamp information which might for example be connected to a logging device/computer for separate analysis by an end user.

In embodiments of the fifth to eighth aspects of the invention in which the higher layer function comprises timestamping packets, the timestamp value may be obtained by sampling a counter register at the moment the start of packet is detected on the receive interface of the switch. In other embodiments timestamping may be performed on the output interface of the switch. The counter register is preferably updated regularly (e.g. every nanosecond) so that it is a precise representation of the current time in nanoseconds. The counter may be synchronised to an external time reference external to the switch via a pulse per second (PPS) signal, precision time protocol (PTP) or the like. Alternatively, the timestamp value may be taken at some fixed time offset after the start of packet, and the actual time that the start of packet was received may then be obtained by subtracting the fixed time offset from the timestamp value. In such embodiments this subtraction can be performed either before the timestamp is written to the FCS field or alternatively it can be performed when post-processing the timestamped data stream.

In some embodiments of the fifth to eighth aspects of the invention, the higher layer function may additionally or alternatively comprise data packet capture, whereby some or all of the duplicate data stream is processed via a media access controller (MAC) and then delivered to a data packet capture RAM, disk and/or PCIe link. In such embodiments, the management platform may be requested to capture a packet that is passing through an interface, such that the packet will be transmitting at line rate without delay, while it is concurrently copied and reported to the end user via a software/management port. In some embodiments, the higher layer function may capture data without MAC processing. In an embodiment, the higher layer function may aggregate the captured data from more than one port.

In some embodiments of the fifth to eighth aspects of the invention the data may be downstream data originating from one or more servers and intended for one or more client devices. Additionally or alternatively, the data may be upstream data originating from one or more client devices and intended for one or more servers. Additionally or alternatively, the data may be peer to peer data such as data being switched between nodes of a high performance computing cluster, or between nodes of a data centre network.

In some embodiments of the fifth to eighth aspects of the invention, the higher layer function may additionally or alternatively comprise deep packet inspection in the case of a firewall, intrusion detection, or extrusion detection.

In some embodiments of the fifth to eighth aspects of the invention, the higher layer function may additionally or alternatively comprise the ability to inject a packet into an interface MAC (media access controller), with the output of the MAC being passed to the physical layer. That is, in such embodiments user software may communicate a packet to the switch via a management interface, and the higher layer function may involve injecting the packet into either the receive or transmit MAC for a specified interface. The packet will then be transmitted on the wire from an interface. The packet may alternatively be created by software or hardware (e.g. FPGA) on the device, i.e. originating on the device instead of being communicated over the management interface. Some such embodiments may inject a packet or packets in order to subscribe to multicast on behalf of downstream hosts, for example, in accordance with the Internet Group Management Protocol Version 2 (IGMP) the subject of the Internet Society RFC2236, and/or in accordance with a protocol-independent multicast (PIM) routing protocol, and/or in accordance with a border gateway protocol (BGP), or the like. In the case of IGMP, subscribing or unsubscribing to a multicast group may comprise injecting IGMP packets for transmission to a neighbouring multicast router to register in a multicast group to receive multicast packets on behalf of downstream clients connected to the ports of the switch of the present invention, thereby obviating the need to have a downstream host perform this function.

In some embodiments of the fifth to eighth aspects of the invention, data ports of the switch may receive data from any suitable cable including for example copper cables using 10GBASE-T interface type or 1000BASE-T interface type, 100BASE-TX copper, optic fibres using 10GBASE-R/1000BASE-X, direct-attach copper. The switch may receive data from any suitable pluggable module, such as SFP, SFP+, QSFP, QSFP+, CFP. Those modules might allow a connection via direct-attach copper, 1 GBase-SX, 10 GBase-SR, 10 GBase-LR, DWDM, or other connectivity standards. Alternatively the switch might be connected directly to another device using a connector or printed circuit board.

In some embodiments of the fifth to eighth aspects of the invention, the higher layer function to which the data is copied may be adaptively selected by switching the copied data stream to one of a plurality of outputs of the switch, each of the plurality of outputs being connected to a respective higher layer function. Such embodiments permit dynamic selection of which higher layer function or functions is or are applied to the copied data stream. In such embodiments, the output of the higher layer function may be returned to the crosspoint switch to permit dynamic and configurable switching of the output of the higher layer function to any chosen output of the crosspoint.

In some embodiments of the fifth to eighth aspects of the invention, the higher layer function may be effected by a signal conditioning block positioned at an input and/or output of the crosspoint switch, to which the data is copied.

BRIEF DESCRIPTION OF THE DRAWINGS

An example of the invention will now be described with reference to the accompanying drawings, in which:

FIG. 8b illustrates handling of one packet in the embodiment of FIG. 8a;

FIG. 14 is a schematic of a signal conditioning block in accordance with the embodiment of FIG. 13.

DESCRIPTION OF THE PREFERRED EMBODIMENTS

Figure 1:
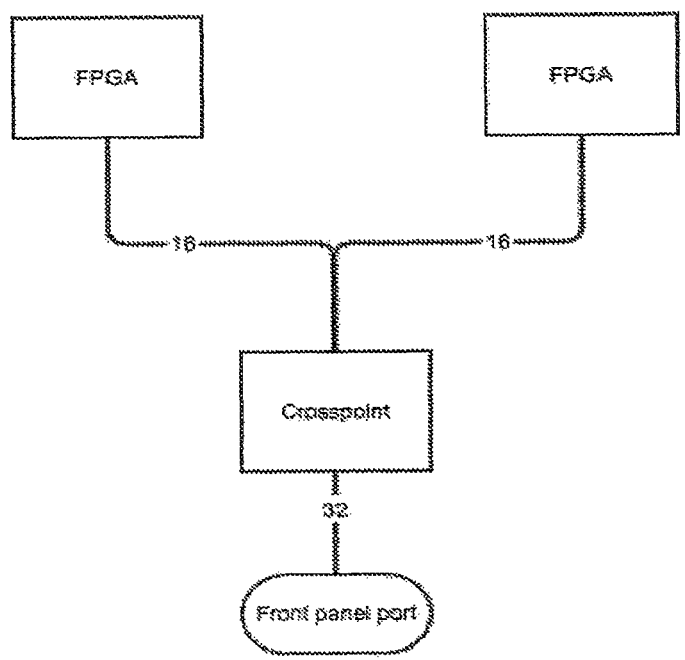
FIG. 1 is a system schematic of the hardware used to implement one embodiment of the present invention.

FIG. 1 is a system schematic of the hardware used to implement one embodiment of the present invention. It consists of some front panel ports which can be connected to other devices, some FPGAs which have transceivers which can talk to the front panel ports, and a crosspoint switch which can remap, as well as multicast data from one port to multiple ports. It is noted that not all of the cross point outputs will necessarily be connected to the logic functions of the FPGAs as some ports will be needed to provide data output to external devices.

For the upstream component of the device of FIG. 1, the device provides an FPGA which takes a number of input streams and multiplexes them into one. This single multiplexed stream is then returned through the crosspoint switch. Since there is very little other logic in the device, there is little congestion, which means the FPGA can be driven at high clock rates, with short pipelines or groupings of logic components in the FPGA. That is, the simplified data pathway allows each element to be highly optimised. This allows for a low latency or other logic.

By combining an FPGA with a crosspoint switch in the manner shown in FIG. 1, it becomes possible to effect the broadcast function in the crosspoint switch, and to effect the filter function or other such functions in the FPGA. The advantage is that the broadcast component can be conducted in the crosspoint where it can be done efficiently with low latency, which leaves only the filtering function to the FPGA. i.e. each filter within the FPGA contains an input and an output. This keeps the complex logic and clocking extremely local (potentially within a short distance of the transceiver itself). This in turn will allow for lower latency within the device. It also means that the transceivers for the downstream component (and therefore the filtering logic) can be spread amongst a number of FPGAs, since there is no need to transport data within the FPGA except locally to the transceiver.

It also means that the upstream component can be implemented in adjacent transceivers with no interaction with the downstream logic, potentially allowing for a much more efficient upstream implementation (e.g. less cycles and lower latency). In alternative embodiments within the scope of the invention, interaction between upstream and downstream logic components may sometimes be required such as when implementing flow control or 1000BASE-X auto negotiation.

Figure 2:
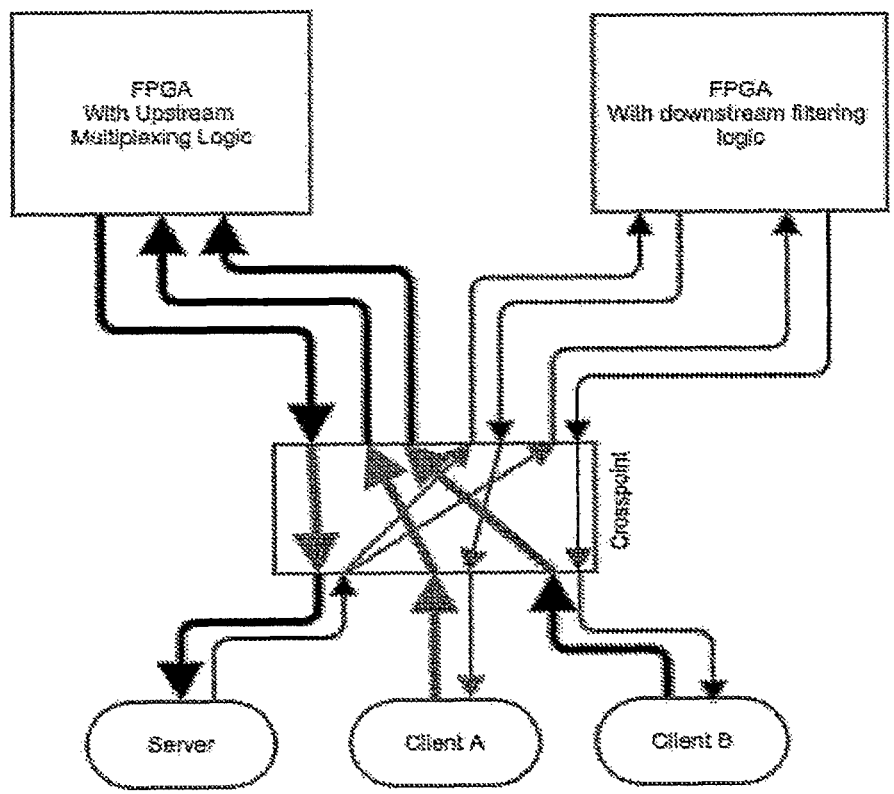
FIG. 2 illustrates handling of upstream data in the system of FIG. 1.

Upstream and downstream logic can even be implemented in separate FPGAs, as shown in FIG. 2. In this configuration it is possible to fit a lot more logic inside the device as a whole. While alternative embodiments may implement both upstream and downstream functions on one FPGA or ASIC, and even in such embodiments the logic for the upstream and downstream components do not need to share hardware resources (in particular, the transceivers) and therefore do not need to reside in the same part of the FPGA, easing routing congestion.

Figure 3:
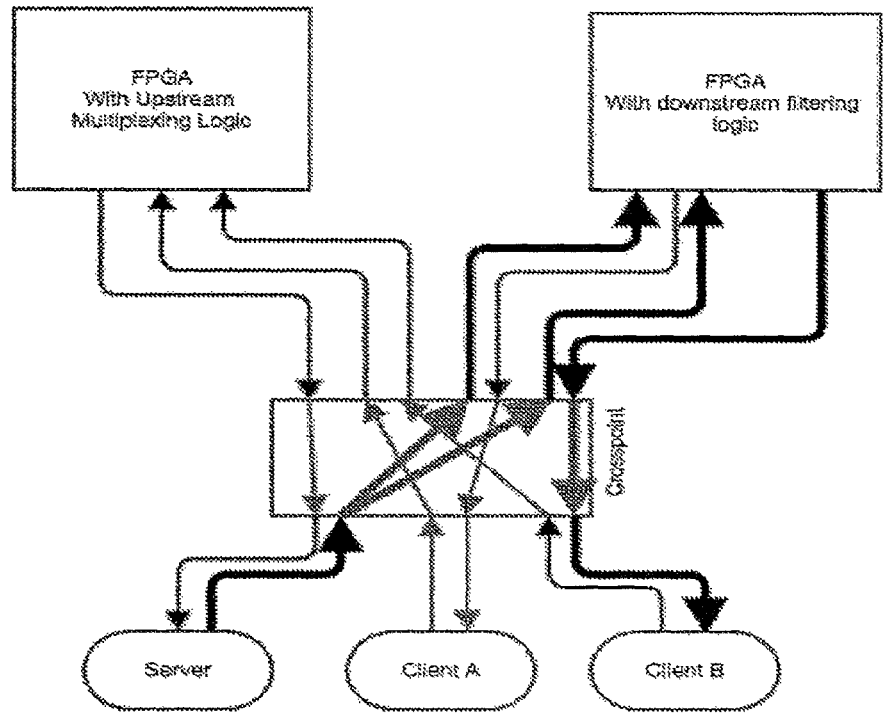
FIG. 3 illustrates handling of downstream data in the system of FIG. 1.

The downstream component is shown in FIG. 3. In this component the logic can also be made simple. When the upstream server sends data addressed to one of the nodes, the data is broadcast by the crosspoint switch to more than one filter within the FPGA. Each filter is very small and self-contained and there is no routing of data over long distances across the FPGA between transceivers. Both the receive and transmit for the filter can be implemented in the same transceiver on the FPGA. The filters operate on the data received from the crosspoint, and the data is only transmitted (back via the crosspoint) to the downstream client if the filter passes the data.

Figure 4:
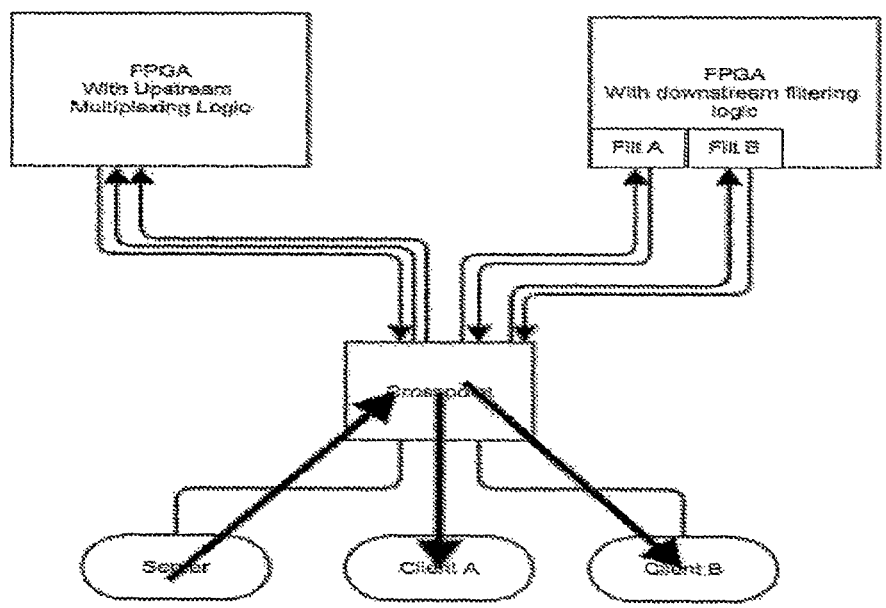
FIG. 4 illustrates broadcasting of downstream data in the system of FIG. 1.

If all clients should receive all data, independent of filtering, the crosspoint can broadcast the data directly to the clients without passing data to the FPGA, as shown in FIG. 4.

In further embodiments of the invention, multiplex and filter functionality can be combined in order to handle multiple upstream servers, or create a fully cross-connected switch.

Figure 5:
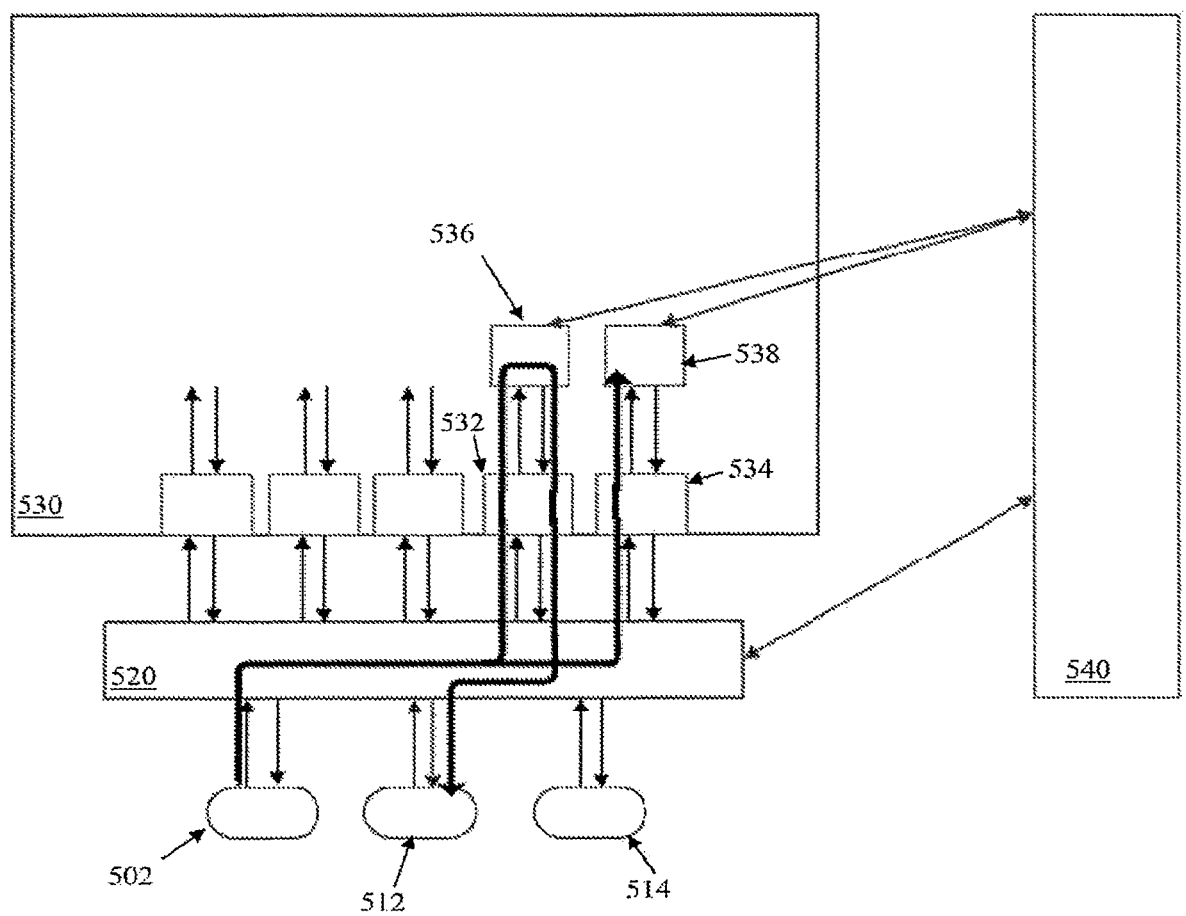
FIG. 5 is a data flow diagram of another embodiment of the invention, providing reconfigurable downstream data filtering.

FIG. 5 is a data flow diagram of an embodiment of the invention providing reconfigurable downstream data filtering. For the downstream case, data is transmitted from an upstream server 502 to several downstream clients 512, 514, with a data flow as shown. The data is transmitted from the server 502 and received at an external port, where it enters the crosspoint switch 520. The data is multicast by crosspoint 520 to FPGA 530, to one transceiver 532, 534 per filter 536, 538. It is possible to use one filter per downstream client 512, 514 as shown, if all of the ports have different filtering requirements, otherwise it is possible to broadcast from a single filter of FPGA 530 to as many clients or ports as desired, by appropriately configuring the crosspoint switch 520. The embodiment of FIG. 5 comprises two filters, one per downstream port. Each filter 536, 538 has a transceiver 532, 534 associated with it, and can either run in one clock domain for both receiving and transmitting (i.e, TX is driven by the recovered clock) or, using a FIFO or other clock domain crossing, in multiple clock domains. The former would be preferred for the lowest possible latency, however some embodiments may use the latter for example to fully re-clock the data and provide the best signal quality for transmission. The chosen scheme will depend on the signal quality required. In FIG. 5 we show the filters implemented in one clock domain.

The data is transmitted by the crosspoint switch 520 to every filter 536, 538, where it is received by a respective transceiver 532, 534. Each transceiver 532, 534 deserialises the data. The filter logic 536, 538 interprets that data and if it matches the required criteria, for example if the data is addressed to the client associated with that filter, the filter re-transmits the data, using the same transceiver, as shown for filter 536. As a consequence of this arrangement the logic 536, 538 can be very close to the respective transceiver 532, 534. If the data does not match the filter criteria, for example if the data is not addressed to the client associated with that filter, then the data is not re-transmitted, as shown for filter 538. The crosspoint switch 520 is configured to transport the output of the filters 536, 538 to the appropriate port(s) associated with clients 512, 514 by the management computer 540. The management computer 540 also configures the filters 536, 538 so that they select the data which should be transmitted to the ports associated with clients 512, 514.

The filter logic 536, 538 can be very simple or very complex, depending on the filtering criteria required and the level of complexity required.

Figure 6:
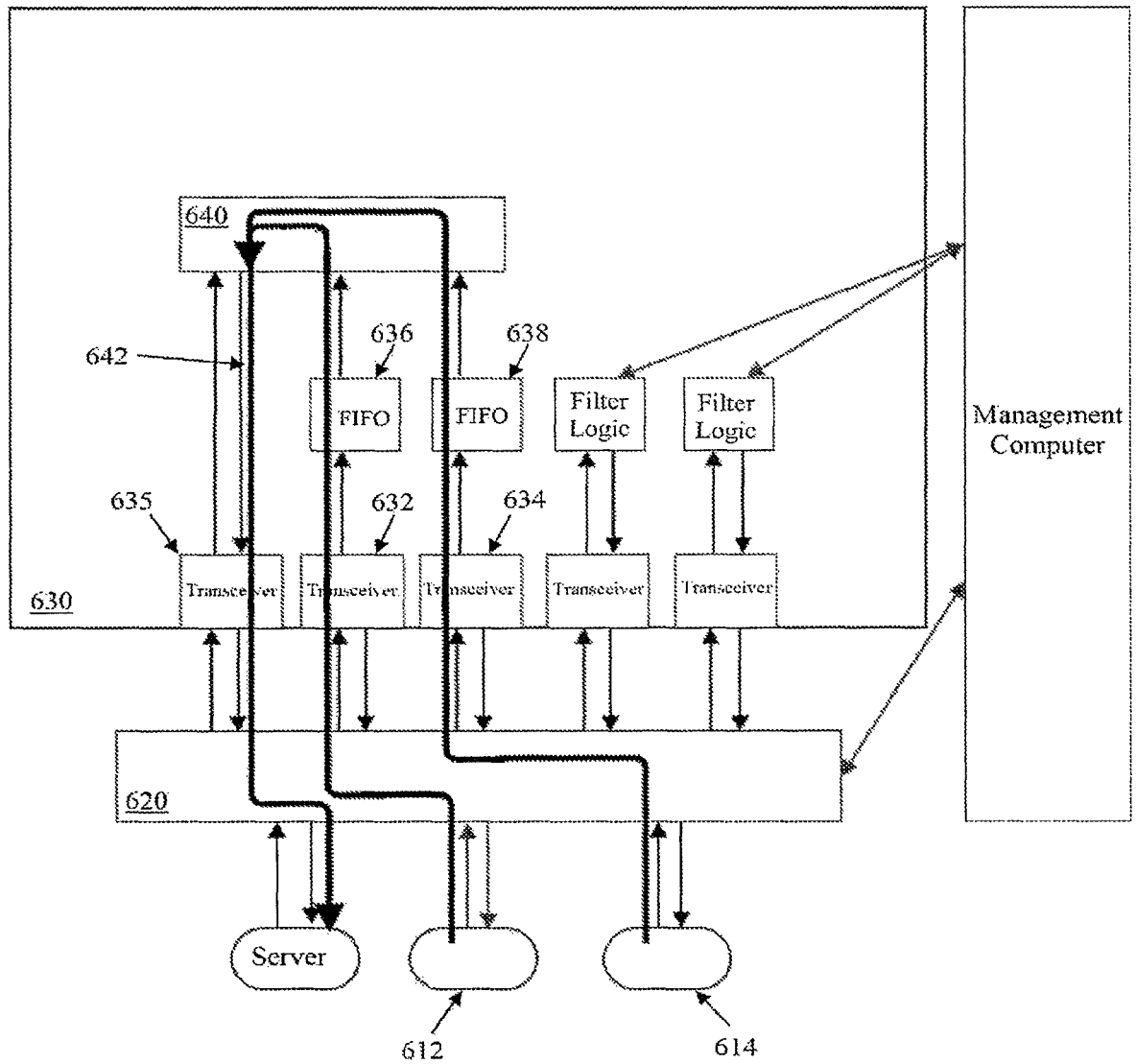
FIG. 6 is a data flow diagram of another embodiment of the invention, providing reconfigurable upstream data filtering.

FIG. 6 is a data flow diagram of an embodiment of the invention providing reconfigurable upstream data filtering. In the upstream case, the crosspoint 620 acts to re-direct the data from the ports associated with clients 612, 614 to independent transceivers 632, 634 on the FPGA 630. The transmit function of transceivers 632, 634 is not used, only the receive function is used. The deserialised data from transceivers 632, 634 is received through a respective FIFO 636, 638 which are each used for crossing clock domains. Multiplexing logic 640 is used to receive the data from the FIFOs 636, 638. Packets of data may then be multiplexed into a single output stream indicated at 642. This is sent via another transceiver 635, although in alternative embodiments the transmitter of one of the receive transceivers 632, 634 could be used instead of transceiver 635, saving the use of one transceiver.

Advantageously in FIGS. 5 and 6, the upstream logic is physically separate from the downstream logic in the FPGA. This allows the logic to be physically smaller in the FPGA, which allows for less pipeline stages and a lower latency.

Figure 7:
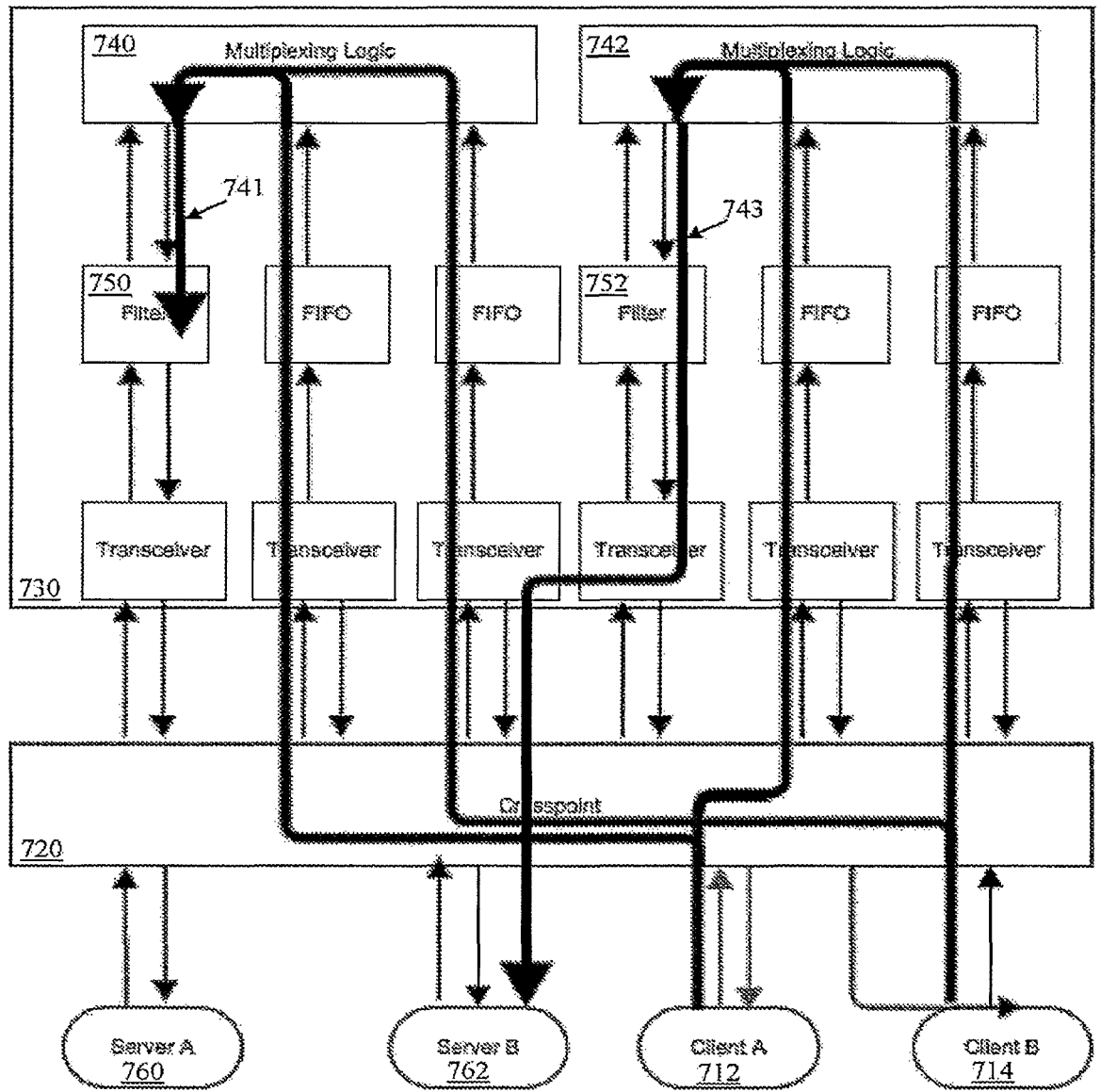
FIG. 7 illustrates another embodiment in which more than one multiplexer is utilised in a single FPGA.

FIG. 7 illustrates another embodiment of the present invention, in which more than one multiplexer is utilised in a single FPGA. By broadcasting packets from clients to multiple multiplexers 740, 742, and filtering the output of those multiplexers with separate filters 750, 752, this embodiment can handle multiple upstream servers 760, 762. While shown with two servers it is to be appreciated that other embodiments can in an analogous manner cater for a larger number of servers. This embodiment thus provides the interconnectivity of a fully connected switch while also providing the advantages of the present invention. In FIG. 7, upstream packets originating from client devices 712, 714 are multicast by crosspoint 720 to two different multiplexing modules 740, 742 implemented in the FPGA 730. Each multiplexing module 740, 742 multiplexes the packets, and then filters 750 and 752 filter the two multiplexed streams to discard those that do not match the respective filter's criteria. In FIG. 7 filter 752 is shown passing the respective data stream 743 intended for server B 762, whereas filter 750 is discarding data stream 741 as it is not intended for server A 760. In a variation of the embodiment of FIG. 7, bandwidth could be increased by providing four filters to implement the filtering before the multiplexing logic 740, 742, rather than after. Moreover, in some applications it may be acceptable for the multiplexed data to be passed to both servers 760 and 762, if it is anticipated that each server will discard data not addressed to that server. In this case filters 750 and 752 may be omitted which would further reduce latency.

The embodiments of FIGS. 1 to 7 thus use a crosspoint switch to multicast data to several points in the analogue domain. By creating multiple copies of the same data, each such embodiment is able to spread the logic for different functions within the same device across different FPGAs or ASICs, or across different parts of a single FPGA or ASIC.

Figure 8A:
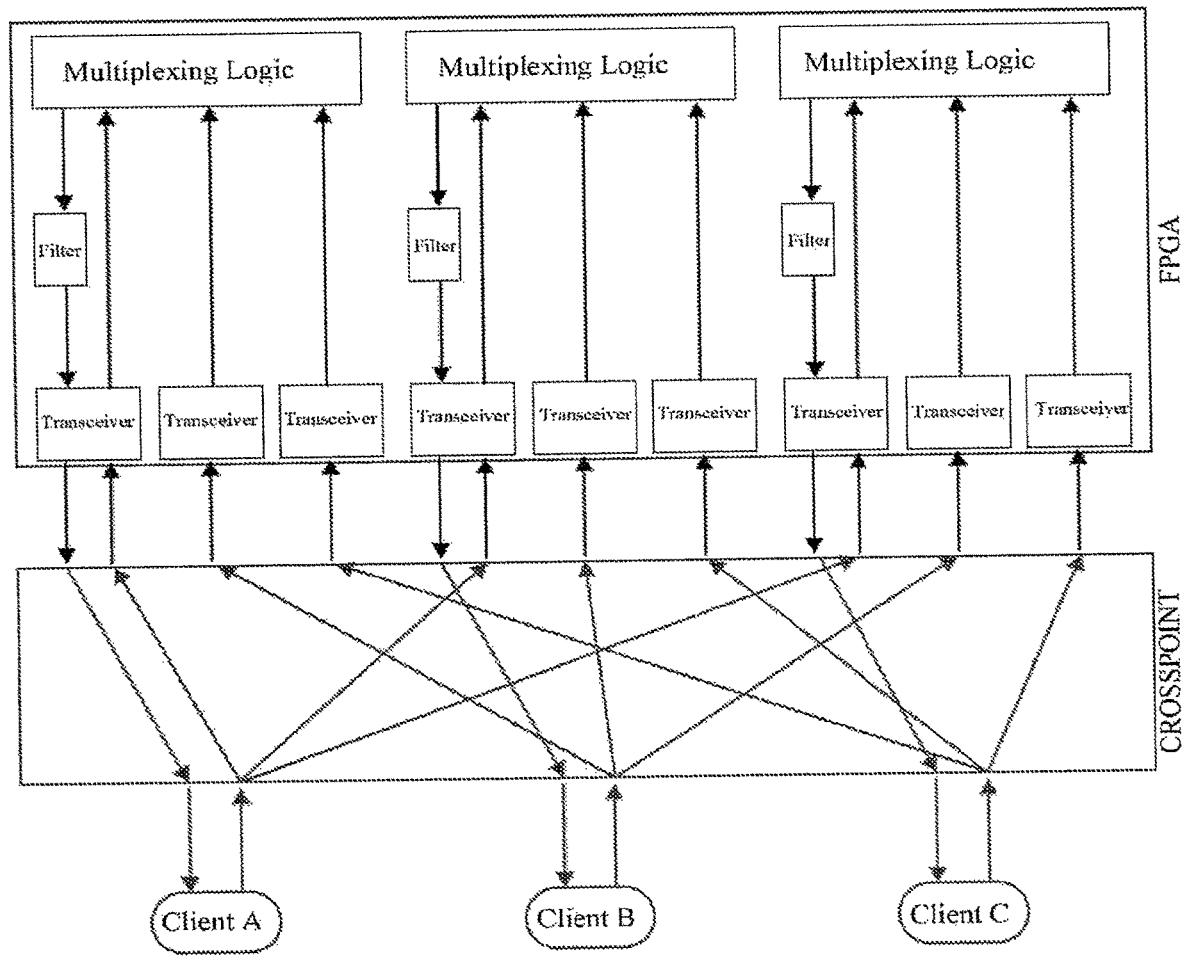
FIG. 8a illustrates a fully cross-connected switch in accordance with another embodiment of the present invention.

FIG. 8a illustrates a fully cross-connected (3×3) switch in accordance with another embodiment of the present invention. As shown, an extension of the mux-and-filter logical function is to add more multiplexers and filters into the FPGA. This allows for packets to be sent from each client to more than one host. In this embodiment each client interface is associated with a unique multiplexer, and this enables packets to be transmitted to any other port. A dedicated filter is provided for each port, and is used to limit the packets received by each port to be only those packets which are addressed to that port. This architecture can be used to implement a traditional Ethernet switch: the filters are configured to forward only packets which are addressed to an address which is known to be connected to a network which is connected to the port for which the filter is filtering.

Figure 8B:
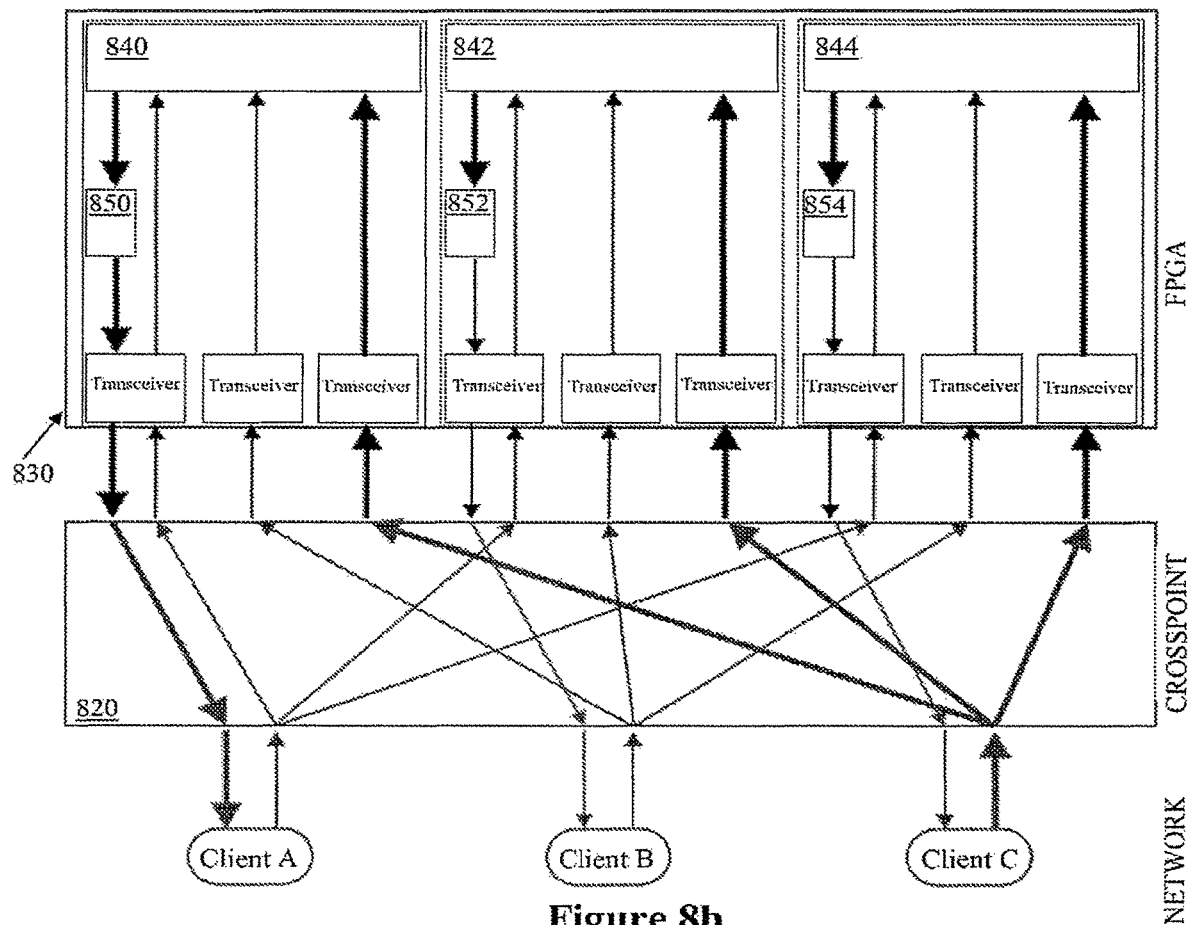

FIG. 8b illustrates handling of one packet in the embodiment of FIG. 8a. In this example the filters are set up to receive only packets addressed to the associated client, and the packets take the path shown. Client C transmits a packet which has a destination address of "Client A". The crosspoint switch 820 is configured to multicast the packet to three different transceivers on FPGA 830. The packets are received by the transceivers and passed to three independent sets of multiplexing logic 840, 842, 844. Each multiplexing logic function multiplexes received data and then transmits the packet to a respective filter 850, 852, 854. The filter 850 for multiplexing logic 840 transmits the packet to its associated transceiver as the packet is addressed to client A. The filters 852 and 854, for Clients B and C, do not transmit the packet. The transceiver for multiplexing logic 840 transmits the packet to the crosspoint switch 820. The crosspoint switch 820 is configured to unicast received data from filter 850 to Client A, and the packet reaches the correct destination. This utilisation of the resources is not optimised for bandwidth, since $N^2$ transceivers and N multiplexers are required to implement an N-port switch. However, such a system can be built with lower latency and better determinism than a system with shared resources.

While the embodiment of FIG. 8 illustrates implementation of an N port fully cross connected switch in accordance with the present invention, in alternative embodiments the handling of data need not be the same for each client or each port of the crosspoint switch. For example, the embodiment of FIG. 8 could be modified in some embodiments so as to be timestamping data received at one port, while multiplexing data received on other ports.

Figure 9:
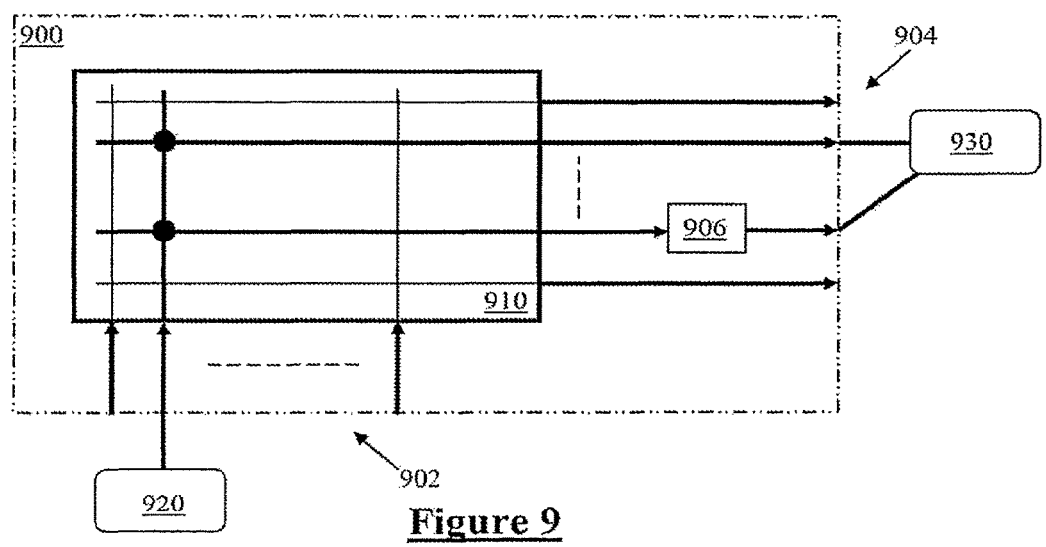
FIG. 9 is a system schematic of the hardware used to implement one embodiment of the present invention.

FIG. 9 is a system schematic of the hardware used to implement one embodiment of the present invention. The switch. 900 comprises a number of front panel ports indicated generally at 902 which can be connected to other devices, and a crosspoint switch 910 which can remap, as well as multicast data from one port to multiple ports.

In the configuration shown in FIG. 9, which can be reconfigured at other times, input data is received from a data source 920 and is circuit switched by crosspoint 910 to a respective data output 904 associated with the intended destination 930. In this sense, switch 900 performs as a physical layer switch. It is noted that outputs 904, while being shown separate to inputs 902, in a typical rack mounted device may be co-located on a front panel of the device with inputs 902. The inputs 902 and outputs 904 may be effected by a plurality of transceivers, each transceiver effecting one data input 902 and one data output 904. Currently active switching paths within crosspoint 910 are indicated in FIG. 9 by firmer lines simply for illustrative purposes.

In accordance with the present invention, the data received from data source 920 is not only delivered to destination 930, but is also copied by the crosspoint switch 910 to a higher layer process which is performed by device 906 within switch 900.

In this embodiment, device 906 comprises a timestamping function so that a second stream of data is delivered from device 906 to destination 930. Destination 930 thus receives the original data via an extremely Low latency path, while, also receiving a timestamped copy of the data albeit with greater latency, due to the additional latency introduced by device 906.

Figure 10:
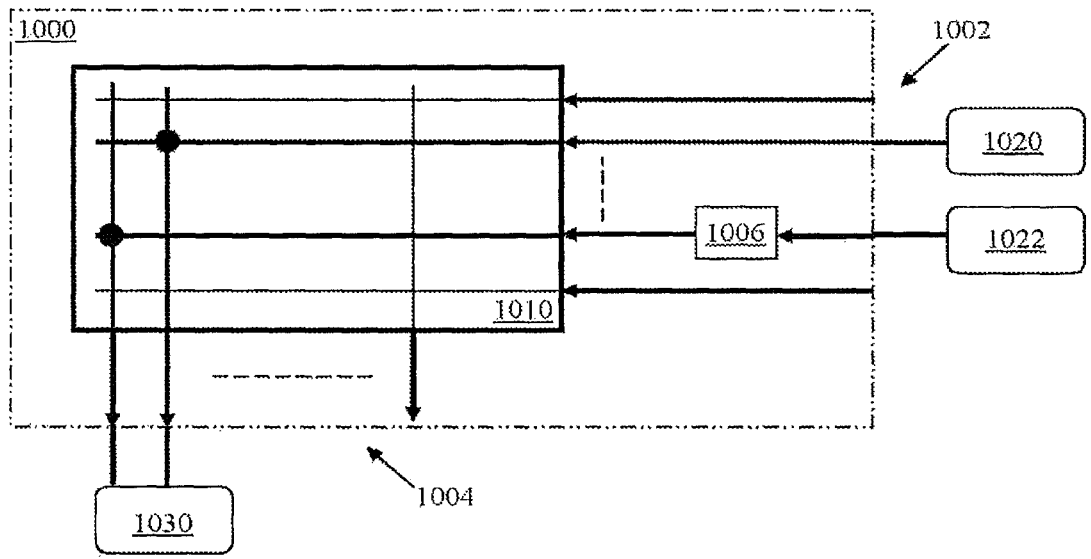
FIG. 10 is a system schematic of the hardware used to implement another embodiment of the present invention.

FIG. 10 is a system schematic of the hardware used to implement one embodiment of the present invention. The switch 1000 comprises a number of front panel ports indicated generally at 1002 which can be connected to other devices, and a crosspoint switch 1010 which can remap, as well as multicast data from one port to multiple ports.

In the configuration shown in FIG. 10, which can be reconfigured at other times, input data is received from a data source 1020 and is circuit switched by crosspoint 1010 to a respective data output 1004 associated with the intended destination 1030. In this sense switch 1000 performs as a physical layer switch. It is noted that outputs 1004, while being shown separate to inputs 1002, in a typical rack mounted device may be co-located on a front panel of the device with inputs 1002. The inputs 1002 and outputs 1004 may be effected by a plurality of transceivers, each transceiver effecting one data input 1002 and one data output 1004. Currently active switching paths within crosspoint 1010 are indicated in FIG. 10 by firmer lines simply for illustrative purposes.

In accordance with the present invention, the data received from data source 1020 is not only delivered to destination 1030, but a higher layer process which is performed by device 1006 within switch 1000 and produces packets which are also switched to output 1030.

In this embodiment, device 1006 comprises a multicasting subscribing function so that IGMP packets are injected into the data stream sent to a neighbouring router 1030 in order for devices 1020 and/or 1022 to subscribe or unsubscribe to a multicast group. Destination 1030 thus receives data from device 1020 via an extremely low latency path, while also receiving higher layer function data such as IGMP data packets injected into either the transmit MAC for the specified interface, albeit with greater latency, due to the additional latency introduced by device 1006.

Figure 11:
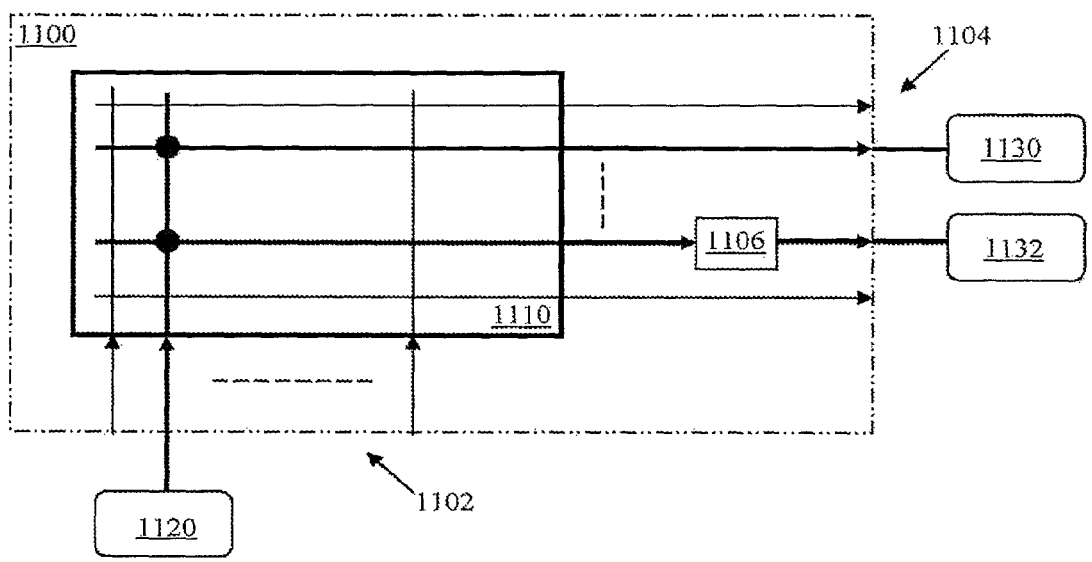
FIG. 11 is a system schematic of the hardware used to implement yet another embodiment of the present invention.

FIG. 11 is a system schematic of the hardware used to implement yet another embodiment of the present invention. The switch 1100 comprises a number of front panel ports indicated generally at 1102 which can be connected to other devices, and a crosspoint switch 1110 which can remap, as well as multicast data from one port to multiple ports.

In the configuration shown in FIG. 11, which can be reconfigured at other times, input data is received from a data source 1120 and is circuit switched by crosspoint 1110 to a respective data output 1104 associated with the intended destination 1130. In this sense switch 1100 performs as a physical layer switch. It is noted that outputs 1104, while being shown separate to inputs 1102, in a typical rack mounted device may be co-located on a front panel of the device with inputs 1102. The inputs 1102 and outputs 1104 may be effected by a plurality of transceivers, each transceiver effecting one data input 1102 and one data output 1104. Currently active switching paths within crosspoint 1110 are indicated in FIG. 11 by firmer lines simply for illustrative purposes.

In accordance with the present invention, the data received from data source 1120 is not only delivered to destination 1130, but is also copied by the crosspoint switch 1110 to a higher layer process which is performed by device 1106 within switch 1100.

In this embodiment, device 1106 comprises a link controller configured to provide data link statistics to an administrator 1132. In this embodiment device 1106 provides a plurality of higher layer functions including detecting physical layer idle patterns and physical layer errors, counting data packets by type, protocol and size, counting data packet errors by error type including invalid FCS, packet size or alignment, and packet MAC address inspection to identify connected devices.

Destination 1130 thus receives the original data via an extremely low latency path, while device 1132 receives data link statistics albeit with greater latency, due to the additional latency introduced by device 1106.

Figure 12:
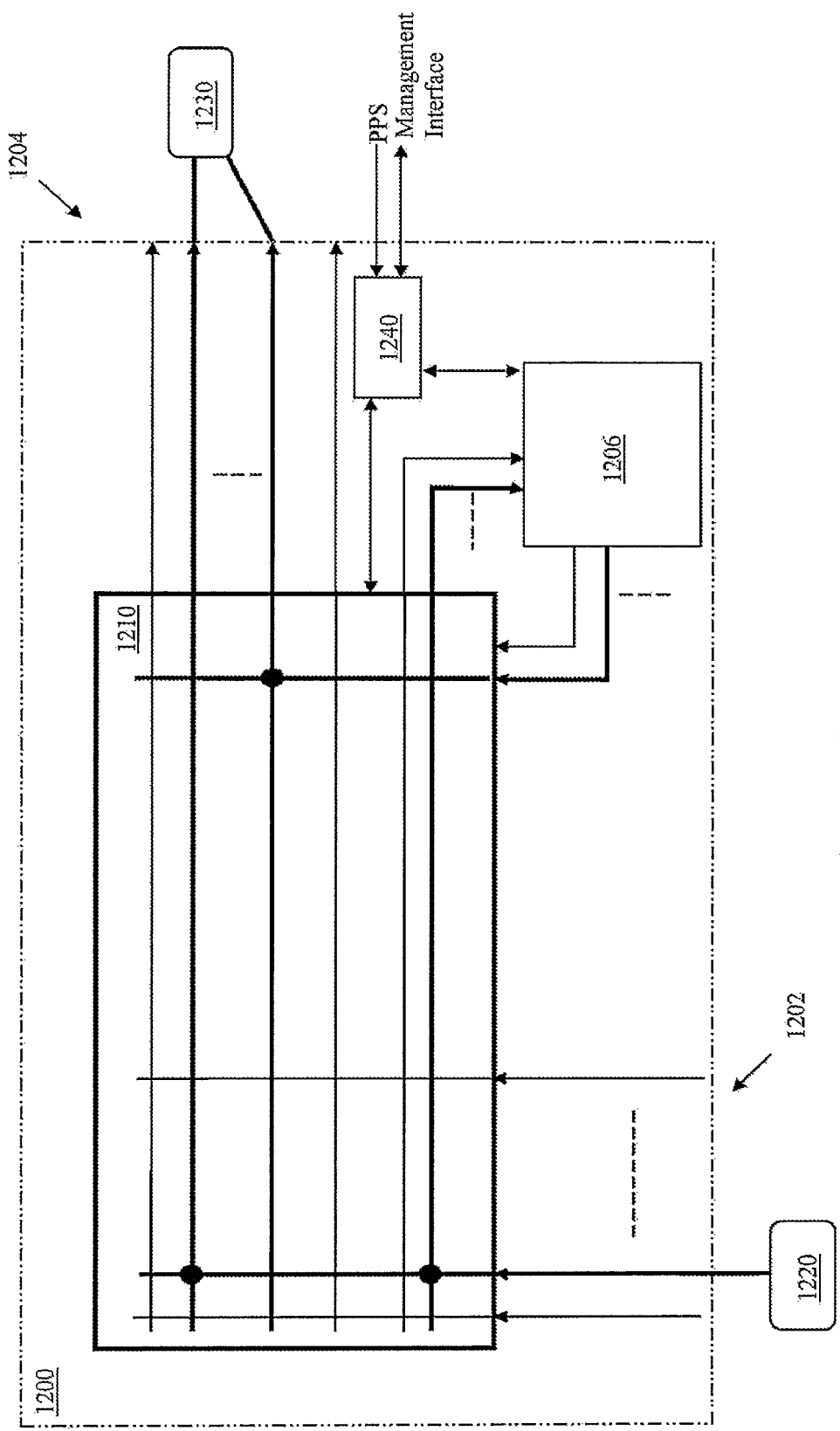
FIG. 12 is a system schematic of the hardware used to implement still another embodiment of the present invention.

FIG. 12 is a system schematic of the hardware used to implement yet another embodiment of the present invention. The switch 1200 comprises a number of front panel ports indicated generally at 1202 which can be connected to other devices, and a crosspoint switch 1210 which can remap, as well as multicast data from one port to multiple ports.

In the configuration shown in FIG. 12, which can be reconfigured at other times, input data is received from a data source 1220 and is circuit switched by crosspoint 1210 to a respective data output 1204 associated with the intended destination 1230. In this sense switch 1200 performs as a physical layer switch. It is noted that outputs 1204, while being shown separate to inputs 1202, in a typical rack mounted device may be co-located on a front panel of the device with inputs 1202. The inputs 1202 and outputs 1204 may be effected by a plurality of transceivers, each transceiver effecting one data input 1202 and one data output 1204. Currently active switching paths within crosspoint 1210 are indicated in FIG. 12 by firmer lines simply for illustrative purposes.

In accordance with the present invention, the data received from data source 1220 is not only delivered to destination 1230, but is also copied by the crosspoint switch 1210 to a higher layer process which is performed by device 1206 within switch 1200. Device 1206 in this embodiment has a plurality of inputs each associated with a selected high layer function, so that a desired function can be selected simply by switching the copied data to the respective input of device 1206. Moreover, the output of device 1206 is returned to crosspoint 1210 and thereby may be selectively switched to any output port 1204, and at the time shown in FIG. 12 the device 1200 is configured to switch the output of higher layer device 1206 to destination. 1230, although at other times the output may be switched to other destinations. A management system processor 1240 receives a pulse per second (PPS) input to enable timestamping and also communicates via a management interface to permit external management. Management system 1240 further controls and communicates with crosspoint 1210 and with higher layer device 1206.

Figure 13:
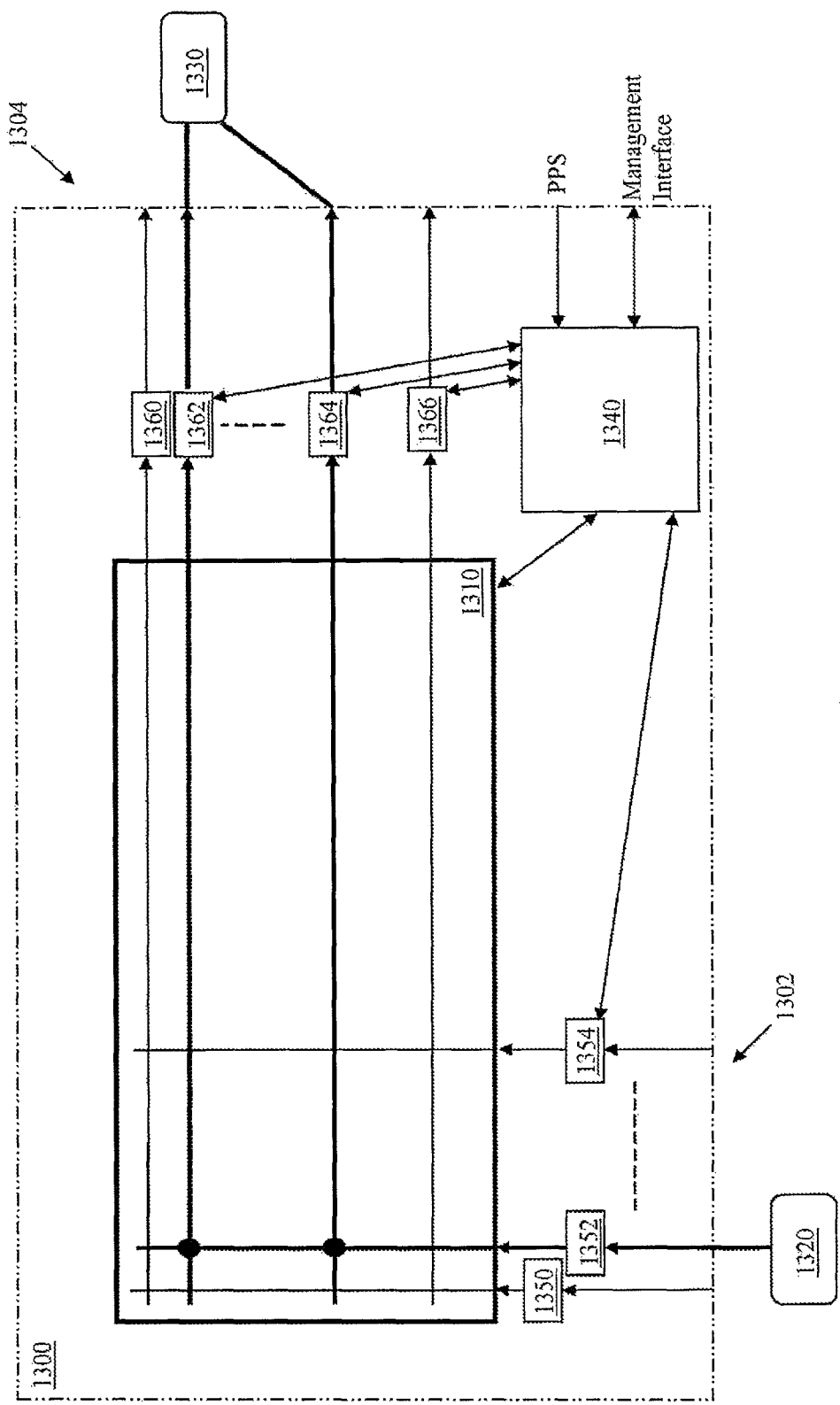
FIG. 13 is a system schematic of the hardware used to implement a further embodiment of the present invention.

FIG. 13 is a system schematic of the hardware used to implement yet another embodiment of the present invention. The switch 1300 comprises a number of front panel ports indicated generally at 1302 which can be connected to other devices, and a crosspoint switch 1310 which can remap, as well as multicast data from one port to multiple ports.

In the configuration shown in FIG. 13, which can be reconfigured at other times, input data is received from a data source 1320 and is circuit switched by crosspoint 1310 to a respective data output 1304 associated with the intended destination 1330. In this sense switch 1300 performs as a physical layer switch. It is noted that outputs 1304, while being shown separate to inputs 1302, in a typical rack mounted device may be co-located on a front panel of the device with inputs 1302. The inputs 1302 and outputs 1304 may be effected by a plurality of transceivers, each transceiver effecting one data input 1302 and one data output 1304. Currently active switching paths within crosspoint 1310 are indicated in FIG. 13 by firmer lines simply for illustrative purposes.

In accordance with the present invention, the data received from data source 1320 is not only delivered to destination 1330, but is also copied by the crosspoint switch 1310 to a higher layer process which is performed by device 1364 within switch 1300. Device 1364 in this embodiment is a signal conditioning block of the type shown in FIG. 14. The output of higher layer device 1364 is passed to destination 1330, although at other times the output may be switched to other destinations. A management system processor 1340 receives a pulse per second (PPS) input to enable timestamping and also communicates via a management interface to permit external management. Management system 1340 further controls and communicates with crosspoint 1310 and controls all of the signal conditioning blocks 1350 . . . 1354 and 1360 . . . 1366.

In the signal conditioning block 1364 shown in FIG. 14, input data is passed through a EQ block 1402 which is configurable via the management interface 1340 as indicated by double-ended arrows throughout FIG. 14. EQ block 1402 is an equaliser that performs filtering on the received signal to compensate for the effects of passing through the communications channel (cable), thus reducing the likelihood of errors. EQ block 1402 can adjust the frequency components of the signal and may also remove multi-path distortion, the output of which is much closer to the ideal representation of the data than the unequalised received signal. From EQ 1402 data is passed to clock data recovery (CDR) block 1404 which is configurable via the management interface 1340. From CDR 1404 data is passed both to a higher layer function 1406 and to a multiplexer 1408, both controlled by management system processor 1340. The output of the higher layer function block 1406 is also passed to multiplexer 1408. From multiplexer 1408, multiplexed low latency data and higher layer function output data are passed to a pre-emphasis block 1410, which modifies the frequency components of the transmitter signal to compensate, in advance, for the expected effects of the communication channel (cable), resulting in the destination receiving a signal which is closer to an ideal representation of the data thus reducing the likelihood of errors. From pre-emphasis block 1410 multiplexed low latency data and higher layer function output data are output by signal conditioning block 1364. Any or all of signal conditioning blocks 1350 . . . 1354 and 1360 . . . 1366 in the embodiment of FIG. 13 may be configured as shown in FIG. 14.

It will be appreciated by persons skilled in the art that numerous variations and/or modifications may be made to the invention as shown in the specific embodiments without departing from the spirit or scope of the invention as broadly described. For example, in embodiments which are applied in relation to multi-lane standards like 40G, these can be treated in a similar way, for example filtering for 40G can happen in a group of four transceivers, and broadcast can happen for all four lanes in one or more crosspoint devices. The present embodiments are, therefore, to be considered in all respects as illustrative and not limiting or restrictive.

The invention claimed is:

1. A method for data switching using a crosspoint switch, wherein the crosspoint switch is operatively connected to a data source, a data destination, a higher layer process device, and a derived data destination, the method comprising:
   receiving data from the data source at the crosspoint switch;

transmitting a first copy of the data from a first output of the crosspoint switch to the data destination;

transmitting a second copy of the data from a second output of the crosspoint switch to the higher layer process device, wherein:

the higher layer process device processes the second copy of the data using a first higher layer process of the higher layer process device to obtain a derived data item corresponding to the second copy of the data, the first higher layer process comprises a multicasting subscribing function, the derived data item comprises a request to subscribe or unsubscribe from a multicast group, and the derived data item is not a portion of the second copy of the data;

injecting the derived data item into a data stream destined for the derived data destination; and transmitting the derived data item to the derived data destination using the crosspoint switch.

2. The method of claim 1, wherein the derived data item destination is the data destination.

3. The method of claim 2, wherein the first copy of the data arrives at the data destination with a lower latency than a latency for receipt of the derived data item.

4. The method of claim 1, wherein the higher layer process device further comprises a second higher layer process, and the method further comprises:

analyzing, by the second higher layer process, the second copy of the data to determine data link statistics; and transmitting the data link statistics to an administrative entity.

5. The method of claim 4, wherein the data link statistics comprise at least one physical layer idle pattern.

6. The method of claim 4, wherein the data link statistics comprise at least one physical layer error.

7. The method of claim 4, wherein the data link statistics comprise a count of data packets by type, protocol, and size.

8. The method of claim 4, wherein the data link statistics comprise a count of data packet errors by error type including invalid frame check sequence (FCS), packet size, or alignment.

9. The method of claim 4, wherein the data link statistics comprise a result of a packet Media Access Control (MAC) address inspection to identify at least one connected device.

10. The method of claim 1, wherein:

the first higher layer process is one of a plurality of higher layer processes of the higher layer process device, and the first higher layer process is a process that is not carried out at a physical layer of a network device comprising the crosspoint switch.

11. The method of claim 10, wherein at least one higher layer process of the plurality of higher later processes is selected for use by providing the second copy of the data to an input of the higher layer process device.

12. The method of claim 10, wherein at least one higher layer process of the plurality of higher layer processes calculates a timestamp corresponding to the second copy of the data.

13. A system for data switching, the system comprising:

a switch operatively connected to a data source, a data destination, and a derived data destination, and comprising:

a crosspoint switch; and a higher layer process device, wherein:

the crosspoint switch is configured to:

receive data from the data source;

transmit a first copy of the data from a first output of the crosspoint switch to the data destination;

transmit a second copy of the data from a second output of the crosspoint switch to the higher layer process device;

inject a derived data item into a data stream destined for the derived data destination and transmit the derived data item to the derived data destination using the crosspoint switch; and the higher layer process device is configured to:

process the second copy of the data using a first higher layer process of the higher layer process device to obtain the derived data item corresponding to the second copy of the data, wherein:

the first higher layer process comprises a multicasting subscribing function, the derived data item comprises a request to subscribe or unsubscribe from a multicast group, and the derived data item is not a portion of the second copy of the data.

14. The system of claim 13, wherein:

the higher layer process device further comprises a second higher layer process configured to perform an analysis of the second copy of the data to determine data link statistics, and the data link statistics comprise at least one physical layer idle pattern or at least one physical layer error.

15. The system of claim 14, wherein the data link statistics further comprise a count of data packets by type, protocol, and size.

16. The system of claim 14, wherein the data link statistics further comprise a count of data packet errors by error type including invalid frame check sequence (FCS), packet size, or alignment.

17. The system of claim 14, wherein the data link statistics further comprise a result of a packet Media Access Control (MAC) address inspection to identify at least one connected device.

18. A method for data switching, the method comprising:

transmitting a first copy of data from a first output of the switch towards a data destination;

transmitting a second copy of the data to a higher layer process device in the switch, wherein:

the higher layer function device processes the second copy of the data using a first higher layer process of the higher layer process device to obtain a derived data item corresponding to the second copy of the data, the first higher layer process comprises a multicasting subscribing function, the derived data item comprises a request to subscribe or unsubscribe from a multicast group, and the derived data item is not a portion of the second copy of the data;

injecting the derived data item into a data stream destined for the derived data destination; and transmitting the derived data item to a derived data destination using the switch.

* * * * *